United States Patent Office 3,600,226
Patented Aug. 17, 1971

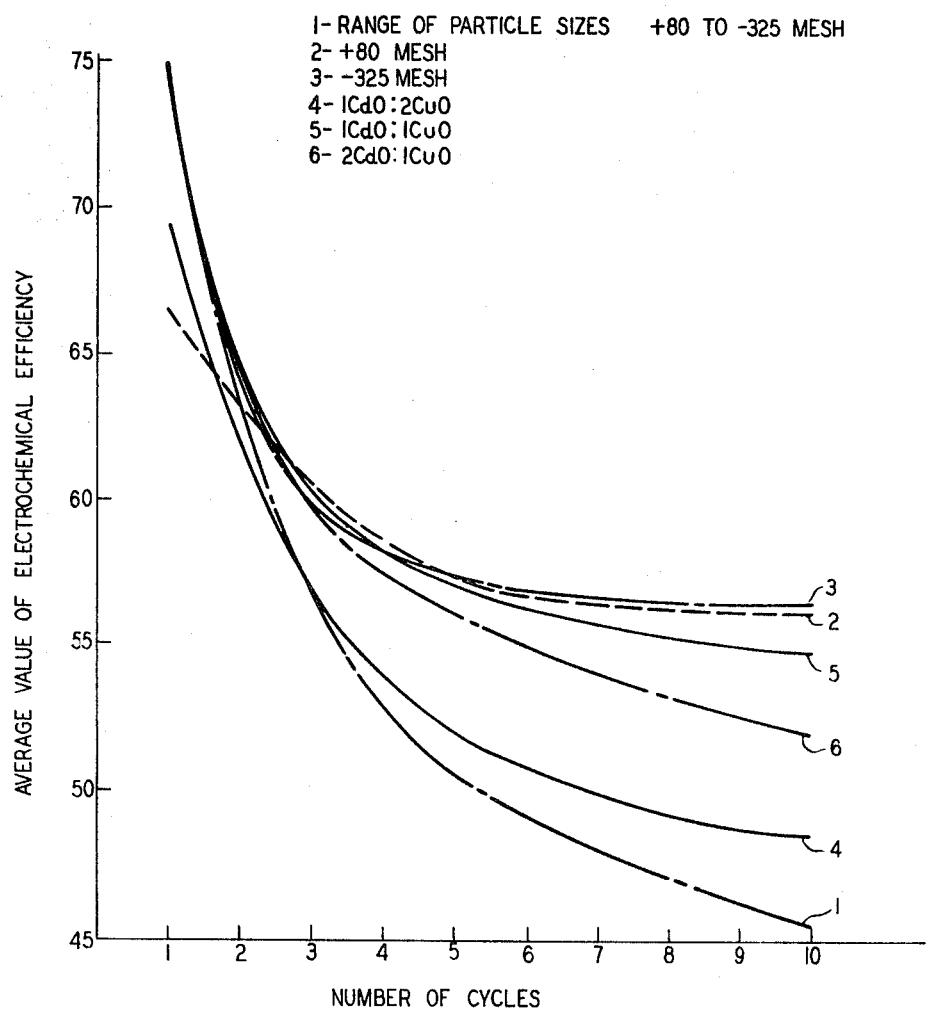

3,600,226
METHOD FOR MAKING CADMIUM ELECTRODES FOR NICKEL-CADMIUM CELLS
Edwin J. McHenry, Millington, N.J., assignor to Bell Telephone Laboratories, Incorporated, Murray Hill and Berkeley Heights, N.J.
Continuation-in-part of application Ser. No. 704,392, Feb. 9, 1968. This application Apr. 24, 1969, Ser. No. 824,351
Int. Cl. H01m 43/04
U.S. Cl. 136—24   5 Claims

ABSTRACT OF THE DISCLOSURE

The disclosure describes a simple, economical, yet effective method for making cadmium electrodes for nickel-cadmium batteries by pressing together cadmium oxide and copper oxide powders around a conductive support screen and electrochemically reducing the oxides. The copper resulting from the reducing process forms into a continuous copper lattice resembling the porous nickel structure of the conventional nickel-sinter electrode. Since the copper does not participate in the electrochemistry of the battery it remains as a permanent support structure for containing the cadmium metal, or the cadmium oxide formed on discharge.

---

This application is a continuation-in-part of my copending application, Ser. No. 704,392, filed Feb. 9, 1968, now abandoned and relates to nickel-cadmium cells. In particular it pertains to cadmium electrodes for use in these cells.

Negative electrodes used in sealed nickel-cadmium batteries are highly porous so that the electrode surface area-to-volume ratio is large. This is necessary to reduce cell resistance and to provide contact area for oxygen recombination on overcharge. Normally, these electrodes are fabricated by impregnating a porous nickel plaque with $Cd(OH)_2$. The resulting electrode is very effective but fabrication of the porous plaque and impregnation are both complicated and costly processes.

The negative electrodes can be made more cheaply and quickly by electroplating or pasting cadmium onto a screen. This method has the disadvantage of using the active material as the structural support and the electronic conductor. Continuous cycling of this electrode leads to disintegration of the structure and to low electrochemical efficiency of the cadmium.

This invention is directed to a new process for producing a useful cadmium electrode by a simple and economic method. In its ultimate structure it resembles the impregnated porous structure characteristic of the most effective electrodes now in commercial service. The novel electrode is produced by mixing copper oxide and cadmium oxide and compressing them into a plaque. The plaque is then electrochemically reduced. The copper formed by the reduction process forms into a continuous lattice which thereafter functions in the same way as the nickel sinter of the conventional plate. The cadmium or cadmium oxide, depending upon the state of charge of the electrode, is held in the copper lattice and since the lattice does not participate in the electrochemistry of the cell its integrity is not affected during cycling. The copper lattice functions effectively as a current collector and distributor for the active material.

The copper lattice can be preserved during cycling by simply adjusting the capacity of the negative electrode relative to the positive electrode in terms of the cadmium oxide content only. Since it is conventional to include 10% to 100% excess negative capacity the amount of cadmium available for oxidation during discharge will be more than the discharge capacity of the positive electrode and some cadmium will remain after the cell is completely discharged. Recognizing that the redox potential of copper is lower than that for cadmium, this means that, ideally, no copper will participate in the electrochemistry of the cell and the copper lattice will remain structurally intact.

A principal feature of this invention is the ease and economy with which this electrode can be formed. The details of the fabrication procedure are given in the following detailed description. In the drawing:

The figure is a plot of electrochemical efficiency versus number of electrochemical cycles for several electrodes prepared by the general technique of this invention.

Several test electrodes were prepared by the following procedure.

Approximately four grams of a mixture of copper oxide and cadmium oxide powders were pressed into a 20 mesh, 7 mil nickel screen, 2¼ inches by one inch, under a pressure of 12,000 p.s.i. The resulting plaque was placed between two platinum plates separated by felted-nylon separators. The plaque was charged as cathode in neutral $K_2SO_4$ requiring approximately one ampere hour (or until hydrogen evolution) to charge. The charging current was 150 ma. (67 ma./in.$^2$). The resulting plate in every case had a strong self-supporting structure and showed no evidence of disintegration after several cycles.

Negative electrodes made by this method have been tested in a sealed cell with conventional nickel hydroxide positive electrodes and KOH electrolyte and found to perform as well as conventional electrodes. Overcharge pressures of only 2 p.s.i. of oxygen at the C/5 (based on negative capacity) rate were observed. The cell has also been charged at $-20°$ F. at C/40 (based on the negative capacity) after discharge at room temperature and showed no indication of developing $H_2$ pressure. The cell did develop $H_2$ pressure at $-40°$ F. at C/40 (based on negative capacity) but did not develop any pressure increase on interrupted overcharge at $-40°$ F. This is an improvement in the low temperature performance over cells using conventional sintered electrodes. The reason for this improvement is unknown but is presumably due to the higher $H_2$ overvoltage on copper.

The several test samples prepared in accordance with the above procedure were made with varying CdO to CuO weight ratios and with different particle sizes. The efficiency of certain exemplary samples over the indicated cycle life is presented in the figure. The data presented here is selected and integrated from data obtained from many test samples so as to give the clearest indication of the effect of particle size and CdO-CuO weight ratio on the cell performance. The data indicates that particles of uniform size should be used and that the uniformity is more important than the absolute size. On this basis it is preferred that the particle size not vary more than approximately ±20%. In this size range this limitation is approximately equivalent to two U.S. seive sizes. From the data relating the weight ratio of CdO to CuO to the electrochemical efficiency it is reasonable to prescribe a range of ratios of CdO to CuO of 1:2 to 2:1.

The details of the reducing process are not considered to be critical. It is desirable to maintain the electrolyte at a pH in the range of 3–13 during the reducing process. If the electrolyte is too acid the oxides dissolve. Strongly alkaline electrolyte produces a weak plaque structure. Best results are obtained with a pH of 3–7. The electrochemical conditions can vary considerably as long as the pressed plaque is effectively charged and the copper oxide is effectively reduced. The conversion of copper oxide to copper occurs at a lower potential than the cadmium oxide-cadmium process so that the potential on charging will exhibit two distinct plateaus. Evolution of hydrogen evidences complete conversion of all electrochemically accessible oxide.

The plates described herein were prepared by pressing the mixed oxide powders onto a support screen which, in the specific example, was nickel but could also be iron, silver, platinum or any conductive material durable under the electrolytic conditions.

According to the exemplary procedure described above the reduction step ordinarily requires that the counter electrodes serve as supports for the unreduced powders. The necessity for the supporting structure during the early stages of the reducing operation, or until a substantial copper lattice is formed, can be eliminated by using a binder for the mixed oxides.

What is claimed is:

1. A method for making a nickel-cadmium cell comprising the steps of assembling, in a sealed receptacle, a positive electrode containing nickel hydroxide and a negative electrode containing cadmium in mutual contact with an alkaline electrolyte, the invention characterized in that the negative electrode is produced by applying a mixture of cadmium oxide and copper oxide to a conductive support screen and electrochemically reducing the mixture to convert all of the electrochemically accessible oxide to metal whereby the copper oxide, being reduced first at a lower potential forms into a continuous or semicontinuous lattice and the cadmium is held within the copper lattice and further characterized in that the amount of cadmium so produced is more than the electrochemical equivalent of available nickel hydroxide in the positive electrode so that when the battery is discharge there is insufficient positive capacity to significantly oxidize the copper lattice thereby leaving the latter substantially intact throughout cycling of the battery.

2. The method of claim 1 wherein the weight ratio of cadmium oxide to copper oxide is in the range of 1:2 to 2:1.

3. The method of claim 1 wherein the said oxides have particle sizes which are uniform within 2 mils.

4. The method of claim 1 wherein the screen is composed of nickel.

5. The method of claim 1 wherein the plaque is reduced in neutral $K_2SO_4$ by passing one ampere hour of current at a rate of 67 ma./in.$^2$.

References Cited

UNITED STATES PATENTS

| | | | |
|---|---|---|---|
| 902,681 | 11/1908 | Perry | 136—24.1 |
| 931,081 | 8/1909 | Perry | 136—24.1 |
| 2,988,585 | 6/1961 | Peters | 136—24 |
| 3,066,178 | 11/1962 | Winkler | 136—24 |
| 3,318,733 | 5/1967 | Stanimirovitch | 136—24 |
| 3,400,056 | 9/1968 | Hills | 136—24 |

WINSTON A. DOUGLAS, Primary Examiner

C. F. LE FEVOUR, Assistant Examiner

U.S. Cl. X.R.

136—23, 28